3,422,553
SNOW BLADE ATTACHMENT
Richard D. Holloway, Dayton, Ohio, assignor to The Huffman Manufacturing Company, Miamisburg, Ohio, a corporation of Ohio
Filed Jan. 26, 1966, Ser. No. 523,214
U.S. Cl. 37—50   3 Claims
Int. Cl. E01h 5/06; A01b 59/048

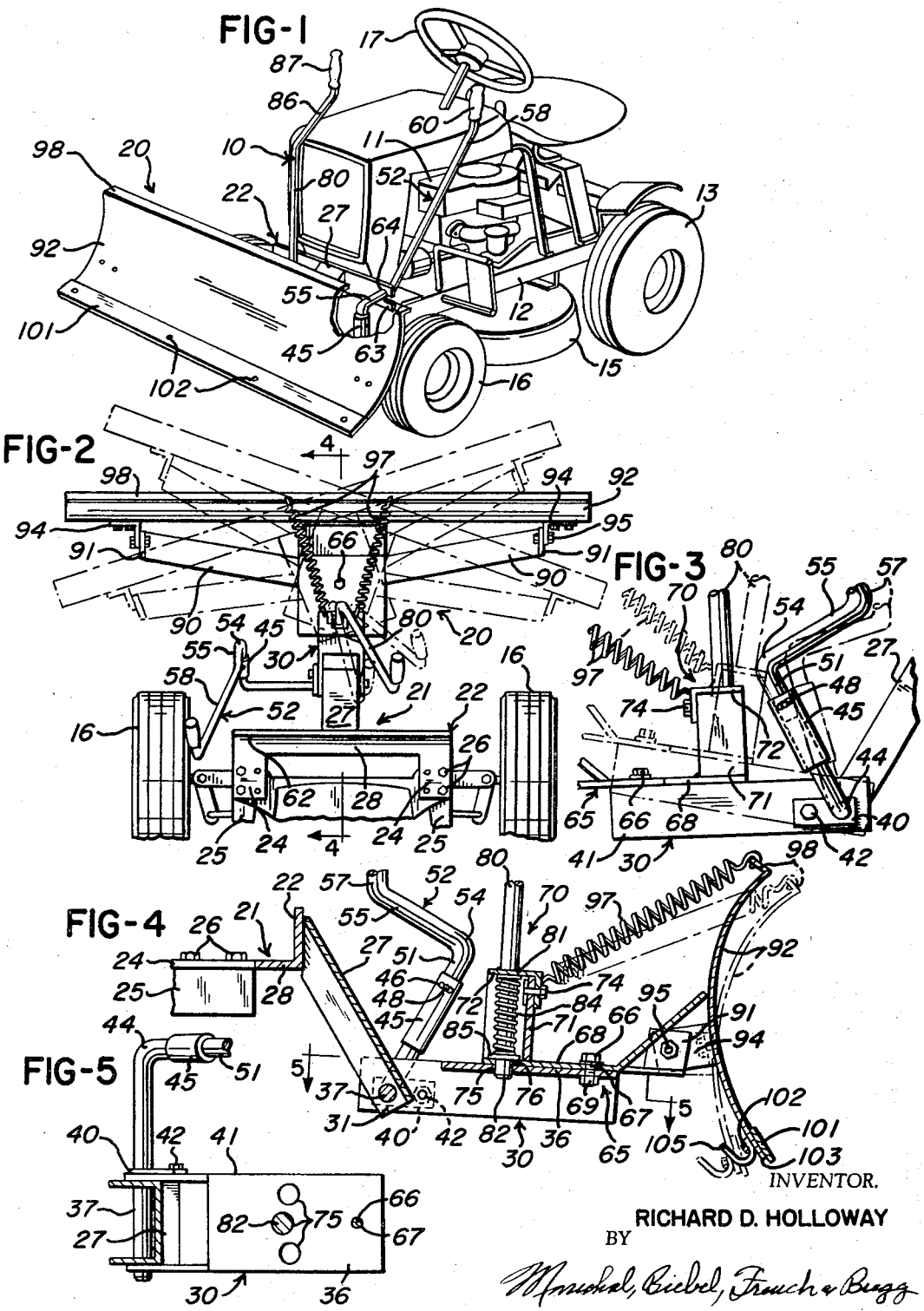

ABSTRACT OF THE DISCLOSURE

A snowplow attachment for a riding type lawn mower which can be easily secured to and removed from the lawn mower. The attachment includes a mounting bracket on the frame of the lawn mower, an intermediate bracket on the forward end of the mounting bracket, and a forward bracket which supports the blade for pivotal movement on a vertical axis to change the angle of attack. A blade is pivotally supported on a horizontal axis on the forward bracket to allow pivotal movement of the blade as it rides over obstructions on the surface being plowed. The upwardly extending handles adjust the angular position of the blade and move it between a lowered plowing position and a raised retracted position.

---

This invention relates to a snow blade attachment or accessory for a vehicle, and particularly for a snow blade attachment for a small tractor.

An important object of this invention is to provide a snow blade attachment for a small four-wheel tractor of the type used as a lawn mower, and particularly to provide an attachment which can be easily secured to and removed from such a vehicle.

Another object of this invention is to provide a snow blade attachment of the aforesaid type which is adapted to be mounted on a small tractor and which can be moved between a raised and lowered position and pivoted about a vertical axis to change the angle of the blade with respect to the direction of travel, and particularly to provide a snow blade attachment which involves only a very few components.

A further object of this invention is to provide a snow blade attachment which is simple in design and therefore is inexpensive in cost and dependable in operation, and further to provide such an attachment wherein the lower edge of the snow blade is biased into position to enable it to pivot rearwardly when an obstruction is contacted thereby enabling the blade to ride over such an obstruction.

These and other objects and advantages of the invention will be apparent from the following description, the accompanying drawings and the appended claims.

In the drawings:

FIG. 1 is a perspective view of a riding type lawn mower having the snow blade attachment mounted thereon;

FIG. 2 is a plan view of the snow blade attachment shown attached to the frame of the lawn mower;

FIG. 3 is an enlarged fragmentary view of a portion of the mounting mechanism;

FIG. 4 is a sectional view taken along the line 4—4 of FIG. 2; and

FIG. 5 is a sectional view taken along the line 5—5 of FIG. 4.

Referring now to the drawings wherein a preferred embodiment of the invention is shown, FIG. 1 illustrates the riding type lawn mower which consists of a small four-wheel tractor 10 having a conventional internal combustion engine 11 mounted on the chassis 12 thereof. The engine 11 drives the rear wheels 13 as well as a rotary cutting blade (not shown) mounted below the tractor 10 and partially enclosed by the housing 15. The forward wheels 16 can be steered manually through the use of a steering wheel 17 by the operator who rides on the seat 18 conveniently disposed behind the steering wheel 17. A suitable clutch mechanism (not shown) is provided so that the lawn cutting blade may be disconnected from the engine 11 while the rear wheels 13 propel the tractor 10.

As indicated above, this invention is directed to the snow blade attachment 20 which can be easily mounted in the position on the chassis 12 thus enabling the owner of the lawn mower to utilize the same during the winter months. The attachment includes a chassis mounting bracket 21 having an L-shaped section 22, as seen in FIG. 2. The ends 24 of the L-shaped section 22 are releasably secured in place on the front portion 25 of the chassis 12 by the conventional bolts 26. A central channel 27 extends downwardly and forwardly from the central section 28 of the bracket 21, as seen in FIG. 4.

The intermediate bracket 30 is pivotally secured to the lowermost end 31 of the central section 28 by the horizontal rod or pin 37 which is part of the lift handle assembly. The intermediate bracket 30 is also channel shaped with the flat horizontal wall 36 on the upper side thereof, as shown in FIGS. 2 and 4. The horizontal pin 37 is held against axial movement by the rectangular plate 40 which is rigidly welded to the pin 37 adjacent one side 41 of the intermediate bracket. The plate 40 is then secured to the side wall 41 by the conventional fastener 42 and thus the pin 37 cannot be removed unless the fastener 42 is removed.

The pivot pin 37 has a right angle bend 44 at one end thereof with a tubular collar 45 secured to the upper portion thereof. This collar has a pair of elongated slots 46 cut near the upper portion on opposite sides thereof for receiving the guide pin 48 which extends through the lower end 51 of the lift handle 52 and through the slots 46 to prevent the lower end from being withdrawn from the collar 45 while allowing limited pivotal movement therebetween. Immediately above the lower end 51, the lift handle 52 makes a substantially right angle bend 54 and after the short section 55 another bend 57 through an obtuse angle. The main section 58 of the lift handle then extends generally rearwardly and upwardly from the bend 57 to the handle grip 60, as shown in FIG. 1.

The left-hand end 62 of the L-shaped section 22 of the mounting bracket 21 has an open ended slot 63 cut therein, as shown in FIG. 1, having an enlarged inner portion 64. By pulling on the handle grip 60 rearwardly, the lift handle 52 can be drawn rearwardly and pivoted into the slot 63 thereby causing the pivot pin 37 to be pivoted thus raising the forward end of the intermediate bracket 30.

A front bracket 65 is mounted on the top wall 36 of the intermediate bracket 30 by the pivot screw 66 which extends through the central openings 67 in the plate 68 and the top wall 36 and receives the nut 69, as seen in FIG. 4. Pivotal movement of this front bracket is controlled by a control handle assembly 70 which includes a handle support 71 extending upwardly from a rigid weld connection on the rearward end of the plate 68. A guide member 72 is mounted on the upper end of this support and is held in place by the conventional fastener 74. The top wall 36 of the intermediate bracket 30 is provided with three angularly spaced openings 75 whereas the plate 68 of the front bracket 65 is provided with a single opening 76 which can be aligned with any of the three openings 75.

The pivot handle 80 extends through an opening 81 in the guide member 72 which is aligned with the opening 76 in the plate 68. The lower end 82 of this handle extends through the opening 76, and is adapted to be received in any of the three openings 75 thereby to lock the front bracket 65 against pivotal movement with respect to the intermediate bracket 30. The handle 80 is biased downwardly by the coil spring 84 which surrounds the handle 80 between the guide member 72 and the radial flange 85 formed adjacent the end 82 of the handle 80. The main portion of the handle 80 extends upwardly from the guide member 72 and has a rearwardly tapered upper section 86 having a handle grip 87 on the end thereof. By moving the handle grip 87 upwardly, the lower end 82 is withdrawn from one of the openings 75 thereby allowing the plate 68 to be pivoted to another position wherein the lower end 82 is aligned with another of the openings 75.

The front bracket 65 includes the outwardly extending arms 90 which are rigidly secured to the opposite sides of the plate 68 and have the upwardly extending flanges 91 on the outermost ends thereof. The snow blade 92 has the angle bracket 94 secured adjacent the opposite side edges thereof, as shown in FIG. 2, and the conventional fasteners 95 secure the brackets 94 to the flanges 91 in a manner to permit the blade 92 to pivot about the axis of the fasteners 95. A pair of springs 97 is interposed between the central portion of the top edge 98 of the blade 92 and the guide member 72 so that the blade is biased in a counter-clockwise direction, as viewed in FIG. 3. However, counterclockwise movement is limited by contact between the upwardly sloped stop member on the bracket 65 and the central portion of the snow blade 92.

The blade 92 is arcuate and made of relatively heavy sheet metal so that it withstands the usual stress encountered by a snow blade of this type. A reinforcing strap 101 is secured by the conventional fasteners 102 along the lower edge 103 of the blade to resist the deformation and stressing normally encountered by the lower edge of the blade as it rides across an irregular but relatively flat surface. The skid brackets 105 are provided at the rear side of the lower edge 103 for supporting the lower edge just above the surface to be plowed.

In operation, the snow blade attachment 20 is mounted on the lawn mower tractor 10 by securing the mounting bracket 21 in place by the screws 26 which engage the front end of the chassis 12. The lift handle 52 is pulled rearwardly and the short section 55 placed in the slot 63 so that the intermediate bracket 30, the forward bracket 65, and the snow blade 92 are pivoted in a clockwise direction, as shown in FIG. 3, to raise the snow blade 92 a substantial distance above the surface which supports the tractor.

The engine 11 of the tractor 10 is then started, and the vehicle is driven to the area in which the snow is to be plowed. The blade angle is adjusted to the right or left of if desired, perpendicularly to the direction of travel, by moving the pivot handle 80 upwardly to withdraw the lower end 82 thereof from the opening 75 in the intermediate bracket 30. While the handle is held in this upper position, the blade 92 is moved to the desired location after which the spring 84 forces the lower end 82 into the appropriate opening 75 to lock the blade 92 in position.

The lift handle 52 is then moved backwards and sideways to withdraw the section 55 from the slot 64 so that the weight of the blade causes pivotal movement about the pin 37 until the blade 92 engages the surface to be plowed. Since the handle is rigidly secured to the intermediate bracket 30, and only limited movement is permitted between the handle 52 and the collar 45, the lift handle 52 remains relatively stationary when the blade is in its lowered position. At any time during the plowing operation it is possible to change the position of the blade 92 with respect to the direction of travel so that the snow is moved right or left or directly ahead of the blade, in the manner described above.

If the lower edge portion of the blade contacts an obstruction of one type or another, such as a raised edge of a concrete sidewalk, the springs 97 permit the blade 92 to pivot about the axis of the pivot members 37 and 95 to a rearward raised position wherein the blade 92 will normally slide or ride over the obstruction. As soon as the blade 92 has cleared the obstruction, the springs 97 return the blade 92 to its normal position wherein the angular position of the lower portion of the blade is such as to provide maximum plowing action. This resilient mounting prevents serious damage to the lower edge of the blade and its support mechanism, as well as possible injury to the driver as might occur if the vehicle is suddenly stopped by such an obstruction. The blade will also ride over large obstructions, such as a curb, since the intermediate and front brackets will pivot upwardly about the pin 37.

The invention has thus provided a simple and inexpensive snow blade attachment for a small tractor of the type used in riding lawn mowers. The blade can be easily moved between a lowered and a retracted position and the position of the blade can be adjusted with respect to the direction of travel of the vehicle, and the blade is designed to ride over obstructions.

While the form of apparatus herein described constitutes a prefered embodiment of the invention, it is to be understood that the invention is not limited to this precise form of apparatus, and that changes may be made therein without departing from the scope of the invention which is defined in the appended claims.

What is claimed is:

1. A snow blade attachment for a riding type lawnmower vehicle having a frame comprising, a mounting bracket adapted to be mounted rigidly on the frame at the front of the vehicle, an intermediate bracket secured to said mounting bracket and adapted for pivotal movement about a horizontal axis with respect to said mounting bracket, first means for selectively positioning said intermediate bracket in a raised or lowered position, said first means includes an elongated upwardly extending handle having its lower end rigidly secured to said intermediate bracket, means defining an open end slot in said mounting bracket adapted to receive said handle to hold the same in said raised position wherein said lower edge portion of said blade is spaced a substantial distance above the plane of the surface which supports the vehicle, a forward bracket secured to said intermediate bracket and adapted for pivotal movement movement with respect to said intermediate bracket about a vertical axis, second means for adjustably positioning said forward bracket in any of a plurality of spaced positions, said intermediate bracket having a flat surface on the top side thereof with a plurality of spaced openings therein, said second means including a handle support on said forward bracket, an elongated handle extending upwardly from said handle support, means defining a single opening in said forward bracket adapted to be aligned selectively with said spaced openings, said handle having a lower end adapted to extend through said single opening and into one of said spaced openings to lock said intermediate and forward brackets against relative angular movement, means biasing said lower end into engagement with said single and spaced openings, a snow blade pivotally secured on the front end of said forward bracket and adapted to move with said front and intermediate brackets about said horizontal and vertical axes, an arm extending outwardly from said forward bracket, means securing the outermost ends of said arm to said blade for pivotal movement of said blade about a horizontal axis, and spring means urging the upper edge of said blade toward said forward bracket to hold said blade in a plowing position while providing for rearward movement of the lower edge of said blade so that said blade will ride over obstrucions.

2. A snow blade attachment as defined in claim 1 wherein stop means are provided on said forward bracket to limit the rearward pivotal movement of top of said upper edge of said blade to hold it in said plowing position.

3. A snow blade attachment as defined in claim 2 wherein said spring means includes a coil spring extending between connectors with said forward bracket and said upper edge of said blade.

References Cited

UNITED STATES PATENTS

| | | | |
|---|---|---|---|
| 345,315 | 7/1886 | Moore | 37—155 |
| 561,988 | 6/1896 | Harmon | 37—155 |
| 3,230,645 | 1/1966 | Lutz | 37—50 |
| 3,028,692 | 4/1962 | Brock | 37—50 |
| 3,353,287 | 11/1967 | King | 37—50 |

ROBERT E. PULFREY, *Primary Examiner.*

EUGENE H. EICKHOLT, *Assistant Examiner.*

U.S. Cl. X.R.

172—447